US008443049B1

(12) United States Patent
Geddes

(10) Patent No.: US 8,443,049 B1
(45) Date of Patent: May 14, 2013

(54) CALL PROCESSING USING TRUST SCORES BASED ON MESSAGING PATTERNS OF MESSAGE SOURCE

(75) Inventor: Martin Geddes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2138 days.

(21) Appl. No.: 10/923,334

(22) Filed: Aug. 20, 2004

(51) Int. Cl.
*H04L 29/06* (2006.01)

(52) U.S. Cl.
USPC ........... 709/207; 709/205; 709/206; 709/208; 709/209

(58) Field of Classification Search .................. 709/207, 709/203, 206
See application file for complete search history.

(56) References Cited

U.S. PATENT DOCUMENTS

| | | | | |
|---|---|---|---|---|
| 5,357,564 | A | 10/1994 | Gupta et al. | 379/188 |
| 5,524,145 | A | 6/1996 | Parker | 379/197 |
| 5,604,791 | A | 2/1997 | Lee | 379/67 |
| 6,289,084 | B1* | 9/2001 | Bushnell | 379/67.1 |
| 6,421,709 | B1 | 7/2002 | McCormick et al. | 709/206 |
| 6,654,787 | B1 | 11/2003 | Aronson et al. | 709/206 |
| 7,085,745 | B2* | 8/2006 | Klug | 705/401 |
| 2003/0172294 | A1* | 9/2003 | Judge | 713/200 |
| 2004/0153512 | A1* | 8/2004 | Friend | 709/206 |
| 2005/0044154 | A1* | 2/2005 | Kaminski et al. | 709/206 |
| 2005/0044156 | A1* | 2/2005 | Kaminski et al. | 709/206 |
| 2005/0097321 | A1* | 5/2005 | Zhu et al. | 713/166 |
| 2005/0102366 | A1* | 5/2005 | Kirsch | 709/207 |
| 2006/0015942 | A1* | 1/2006 | Judge et al. | 726/24 |
| 2006/0031318 | A1* | 2/2006 | Gellens | 709/206 |
| 2006/0123428 | A1* | 6/2006 | Burns | 719/318 |

OTHER PUBLICATIONS

Smart Mobs, *Sword of Damocles?*, http://www.smartmobs.com/archives/003131.html, pp. 1-3 (May 2, 2004).
Smart Mobs, *Keeping Up with the Jones*, http://www.btexact.com/publications/features?doc, pp. 1-5 (May 3, 2004).

* cited by examiner

*Primary Examiner* — Kenny Lin
*Assistant Examiner* — Abdelnabi Musa

(57) ABSTRACT

Messaging patterns for a plurality of subscribers are obtained and analyzed to determine a "trust score" that is an indication of the likelihood that a given message for a particular subscriber is of interest, as opposed to unwanted, e.g., spam or telemarketing phone calls. Subscribers establish or set trust score thresholds and call processing actions to take based on the thresholds and the trust score for a given incoming communication. For example, if a subscriber establishes a processing action of "block call" for calls with a "low" threshold trust score, and an incoming message (email, SMS, instant message, or phone call) has a trust score of "low" or "very low", the message is blocked. Conversely, if the trust score for the message is "high" and the user has specified to pass through "high" trust score messages, the message is passed through. Various algorithms can be used compute trust scores based on messaging patterns.

22 Claims, 7 Drawing Sheets

| SUBSCRIBER 110 | | TRUST SCORE FOR NEW MESSAGE 120 | | | | | | | | | |
|---|---|---|---|---|---|---|---|---|---|---|---|
| | | 1 | 2 | 3 | 4 | 5 | 6 | 7 | 8 | 9 | 10 |
| TOM 112 | EMAIL 114 | BLOCK | BLOCK | BLOCK | DI | DI | IB | IB | IB | IB | IB |
| | PHONE 116 | BLOCK | BLOCK | VM | VM | PT | PT | PT | PT | PT | PT |
| | SMS 118 | BLOCK | PT | PT | PT | PT | PT | PT | PT | PT | PT |
| MARY 122 | EMAIL | BLOCK | DI | DI | IB | IB | IB | IB | IB | IB | IB |
| | PHONE | VM | VM | PT | PT | PT | PT | PT | PT | PT | PT |
| | SMS | BLOCK | BLOCK | PT | PT | PT | PT | PT | PT | PT | PT |
| JOE 124 | EMAIL | | | | | | | | | | |
| | PHONE | ETC. | ETC. | ... | ... | ... | ... | ... | ... | ... | ... |
| | SMS | | | | | | | | | | |

DI = DELETED ITEMS FOLDER
IB = IN BOX FOLDER
VM = VOICE MAIL
PT = PASS THROUGH

Fig. 6

TRUST SCORE FOR NEW MESSAGE

130 ↘    134

| SUBSCRIBER | | VERY LOW | LOW | MEDIUM | HIGH |
|---|---|---|---|---|---|
| TOM (132) | EMAIL | BLOCK | DELETED ITEMS | INBOX | INBOX |
| | PHONE | BLOCK | VOICE MAIL | VOICE MAIL | PASS THROUGH |
| | SMS | BLOCK | INBOX | INBOX | INBOX |
| MARY (136) | EMAIL | DELETED ITEMS | INBOX | INBOX | INBOX |
| | PHONE | VOICE MAIL | PASS THROUGH | PASS THROUGH | PASS THROUGH |
| | SMS | INBOX | PASS THROUGH | PASS THROUGH | PASS THROUGH |
| 138 | ETC. | | ETC. | ETC. | ETC. |

Fig. 7

CALL PROCESSING USING TRUST SCORES BASED ON MESSAGING PATTERNS OF MESSAGE SOURCE

BACKGROUND OF THE INVENTION

This invention relates to methods of processing incoming communications by a carrier (e.g., telecommunications service provider) or other intermediary on behalf of a subscriber. The communication can be, for example, incoming email or phone calls. The processing could take the form of diverting the call to voice mail, blocking the call or email, allowing the call to go through, or some other action. These actions can be viewed as filtering actions. More particularly, the invention relates to a method and system for processing incoming communications based on a "trust" or "reputation" score that is assigned to the communication (or, alternatively, to the source of the communication), and to methods for building a database of trust or reputation scores for use in filtering communications for subscribers. The trust scores are based on calling or emailing patterns of the source of the communication.

Filtering techniques for blocking unwanted junk email, also known as "spam," are described in U.S. Pat. No. 6,654,787. The '787 patent describes a rules-based filtering approach in which a number of different filters apply different filtering criteria. These criteria include specific key words in the title or body of the email, a mathematical signature (e.g., a checksum), a virus checking filter; and an inclusion list (passing emails from previously approved sources). The patent further suggests that other filter modules could filter on the basis of word or letter frequency analysis, IP source frequency analysis, misspelling analysis, word or letter combination analysis, technical or legal RFC 822 header compliance, and feature extraction and analysis, e.g., based on phone numbers, URL's, addresses and so forth. U.S. Pat. No. 6,421,709 describes a similar method for filtering junk email based on user-specified email addresses or character strings which are in emails the user does not want to receive.

Screening and security related techniques directed specifically to telephone systems are disclosed in U.S. Pat. Nos. 5,604,791; 5,357,564 and 5,524,145.

Despite the advances represented in the above-referenced patent documents, the amount of unwanted messages seems to increase every year, particularly electronic messages such as spam. Furthermore, despite the advent of a national "do not call" list, unwanted calls from telemarketers, charities, and other organizations are still a recurring annoyance for many persons.

As technology has advanced over the last 10 years, portable communications devices such as wireless phones and similar devices have the capacity to communicate with third parties using a wide variety of technologies. These technologies include use of the cellular infrastructure to send and receive both voice calls as well as data calls (e.g., email messages), sending and receiving instant messages, sending and receiving messages in accordance with the Short Message Service (SMS) standard, and sending and receiving calls using the public switched telephone network via a base station that is connected to land line telephone circuits.

The present invention provides a more robust approach to call processing, e.g., screening and filtering, that uses "trust scores" for the communication, on the basis of inferences and assertions as to the relatedness of the parties to the communications or the likelihood that the communication is of interest to the recipient. The trust scores are determined from messaging patterns or possibly other indicia indicating a prior relatedness or relationship between of the parties. The invention is generally applicable to a variety of types of communication, and is not limited to email or voice. Moreover, the present invention allows a user to control the call screening function in a very simple manner using the trust scores, as described herein, without having to specify a large number character strings, key words, email addresses, and so forth in order to implement a screening filter. Additionally, because filters based on key words and character strings, they can be avoided relatively easily. Spammers are constantly changing their tactics to get through filters based on these strategies.

While the present invention described herein may be implemented in a completely stand alone fashion, it can also be used in combination with other screening devices and techniques, such as those described in the above-mentioned patent documents.

SUMMARY OF THE INVENTION

This invention provides a method for controlling the call processing for incoming messages to a subscriber based on a trust score assigned to the source of the message (or to the message itself), and a subscriber-specified threshold trust score. The call processing may take the form of filtering (e.g., blocking the call) or taking some other action, such as sending the message to a voice mail, sending the message to an in-box (in the case of an email message), allowing the message to reach the subscriber, or other action.

The trust score for the incoming message is a score, value or index, typically but not necessarily a numerical value. The value of the trust score bears a correlation to probability that the message is one that the recipient would wish to receive, i.e., is a legitimate message, as opposed to a junk email (spam), a phone call from a telemarketer, or other types of unwanted messages. The "trust score" can also be viewed as a level of interest or importance that is assigned to the communication. It can also be viewed as an index of relatedness between the parties to the communication, with more relatedness between the parties being indicative that the more likely it would be that the recipient would want to receive the communication.

The recipient can establish one or more thresholds or particular or trust score values that dictate how the carrier of the communication should treat the communication (e.g., delete it, send it to special mail box or voice mail, etc.) The threshold trust score could be a numerical index value (e.g., 50 on a scale of 1 to 100). The user specifies call-processing actions to take based on whether the incoming communication is above or below the threshold. The threshold level could also be expressed as general levels such as "low", "medium" or "high". The processing of the call will depend on the relationship between the trust score associated with the message and the threshold. For example, if the trust score associated with the message is below 50, or in a "low" range, the call is blocked. If the trust score associated with the message is above 50, or in a "medium" or "high" range, the message is passed through to the subscriber.

According to an exemplary embodiment, the invention may involve a network node, server, or other entity of a telecommunication service provider ("carrier" herein) or other such intermediary carrying out several functions. Firstly, the carrier, as intermediary in telecommunications, regularly monitors messaging patterns for subscribers (and possibly non-subscribers, in cooperation with other carriers) and computes a "trust score" per subscriber. The messaging patterns could be patterns of communications generally, which could include phone call patterns, electronic messaging patterns (e.g., e-mail, instant messaging messages, short messaging service (SMS) messages as defined in the standards document IS-41C, etc.), fax messaging patterns, or other messaging patterns. The patterns could also relate specifically to interaction between the subscribers and particular other subscribers of interest, e.g., those other subscribers who will set rules as described below. The trust scores could be either computed in real time, at the time of the sending of the message in question, or could be computed at some frequency, e.g., monthly, weekly or semi-annually, and stored in a central database.

The trust score for the source of the message could take the form of a numerical value, e.g., 32 on a scale of 1 to 100, or fall into a general descriptor or index such as "low" or "high." In one possible embodiment, a trust score is established that is constant or unchanging for all subscribers. For example, a certain party X that sends an extremely high volume of email messages but receives very few emails is likely a spammer and would therefore have a trust score with a low numerical value, e.g., 1 on a scale of 1 to 10, or a trust score of "low". The value of the trust score for party X would be the same for all subscribers. This trust score could be established by the telephone or email service provider for party X, or by some independent agency that assigns trust score.

Alternatively, the trust score for the party X could vary for each of the subscribers of communications services from a particular communications entity (e.g., phone company, internet service provider, etc.). In particular, the rules or formulae, which are used to calculate the trust score, could be individually specified or weighted in accordance with criteria specified by each subscriber. For instance, party X might have a certain telephone calling pattern, for example, a very high number of short telephone calls, and very few long telephone calls and very few telephone calls coming in, i.e., a calling pattern that could be associated with a telemarketer. Subscriber A might view that calling as reflecting a high level of trust, while subscriber B might view the pattern as reflecting a low level of trust. The phone company could allow subscribers A and B to specify different rules or formulae as to how the messaging pattern of X should be weighted or analyzed in order to compute the trust score for messages originating from X. As such, the network node may maintain a matrix of trust scores for a population of calling parties that send messages to a population of subscribers, with the trust score for each calling party varying depending on how the population of subscribers chooses to weight or analyze the messaging patterns of the calling parties.

As another example, the trust scores could be weighted or influenced by an index of relatedness between a given subscriber and other subscribers. One way of determining relatedness is to look at messaging patterns between parties. Another way would be to look at contact files that indicate relatedness between parties (such as an electronic address book). Parties that are found in other subscribers' address books are likely to have a higher degree of relatedness (and unlikely to be a spammer or telemarketer) and thus should have a higher trust score; whereas a party that sends lots of messages but is not in any address books should have a lower score on relatedness and should have a lower trust score.

The network node also receives and stores input from subscribers that is used to indicate how the call processing is to proceed for a message with a given trust score. This input will take the form of a threshold trust score and associated call-processing action to take, such as for example call blocking or call forwarding. The threshold trust score and the action to take are stored in a database. The threshold trust score could be a numerical value and instructions associated with the numerical value. The subscriber could specify multiple trust scores and instructions for each trust score. For example, the subscriber could specify that if the trust score for an incoming message is below 3 (on a scale of 1 to 10) then block the message, if the trust score is 4 or 5 and the message is a phone call, send it to voice mail, and if the message is an email, put it in a deleted items folder, and if the trust score is above 5, send the message through. In a system in which trust scores are computed and stored as general indices, such as "very low", "low", "medium" and "high", the threshold trust score could also take the form of an index such as "low", and the subscriber provides instruction for how call processing should proceed for one or more of the general indices, e.g., if the incoming message has a "low" trust score, block the message.

The carrier, as intermediary, detects a message (phone call, email, SMS message, etc.) placed to the given subscriber from a source. The source may or may not be a subscriber to the same telecommunications service provider. The carrier includes a network node or server that determines the trust score associated with the source of the message, or equivalently the trust score assigned to the message itself. The trust score could be determined immediately in real time from calculations in accordance with a trust score algorithm based on messaging patterns of the party and the rules/weighting specified by the subscriber or the carrier. Alternatively, the trust score for the party could have been previously calculated and stored in a database, and accessed by the network server at the time the message is received. The carrier compares the trust score to the threshold that was designated by the called party subscriber.

The carrier then responsively carries out the call processing action that was designated by the subscriber based on the comparison of the trust score for the message with the threshold trust score. For example, if the trust score for the message is 5 on a scale of 1 to 10 and the message is an email, and the user specified that trust scores of 5 or more are "valid" email messages, the email message is sent to the subscriber's in-box. If the trust score for the message is "4" and the message is an email, and the user specified that emails with a trust score below 5 are to be sent to the deleted items folder in their email application, then such action is taken. Analogous functions are performed for other types of messages, such as phone calls or SMS messages. If the subscriber specified that "low" phone or SMS messages are to be blocked, the message is blocked. The carrier may provide a message to the calling party telling them that the message was blocked, depending on subscriber preferences.

In one possible embodiment, the trust scores can age and be recalculated at periodic intervals. Alternatively, the trust scores could be calculated in such a fashion that the age of the data is weighted such that older data is given less weight. For example, messaging patterns or relatedness data (such as address book contacts) that is more recent is given more weight than messaging patterns and data that is more than six months old.

BRIEF DESCRIPTION OF THE DRAWINGS

FIG. 6 is an example of one possible database or table that lists threshold trust scores for a plurality of parties and the call processing instructions associated with each of the threshold trust scores. The parties shown in FIG. 6 could, for example, be subscribers to a common communications provider, e.g., phone company or internet service provider.

FIG. 7 is another example of one possible database or table that lists threshold trust scores for a plurality of subscribers and the call processing instructions associated with each of the threshold trust scores.

DETAILED DESCRIPTION OF PREFERRED EMBODIMENTS

Figure 1:
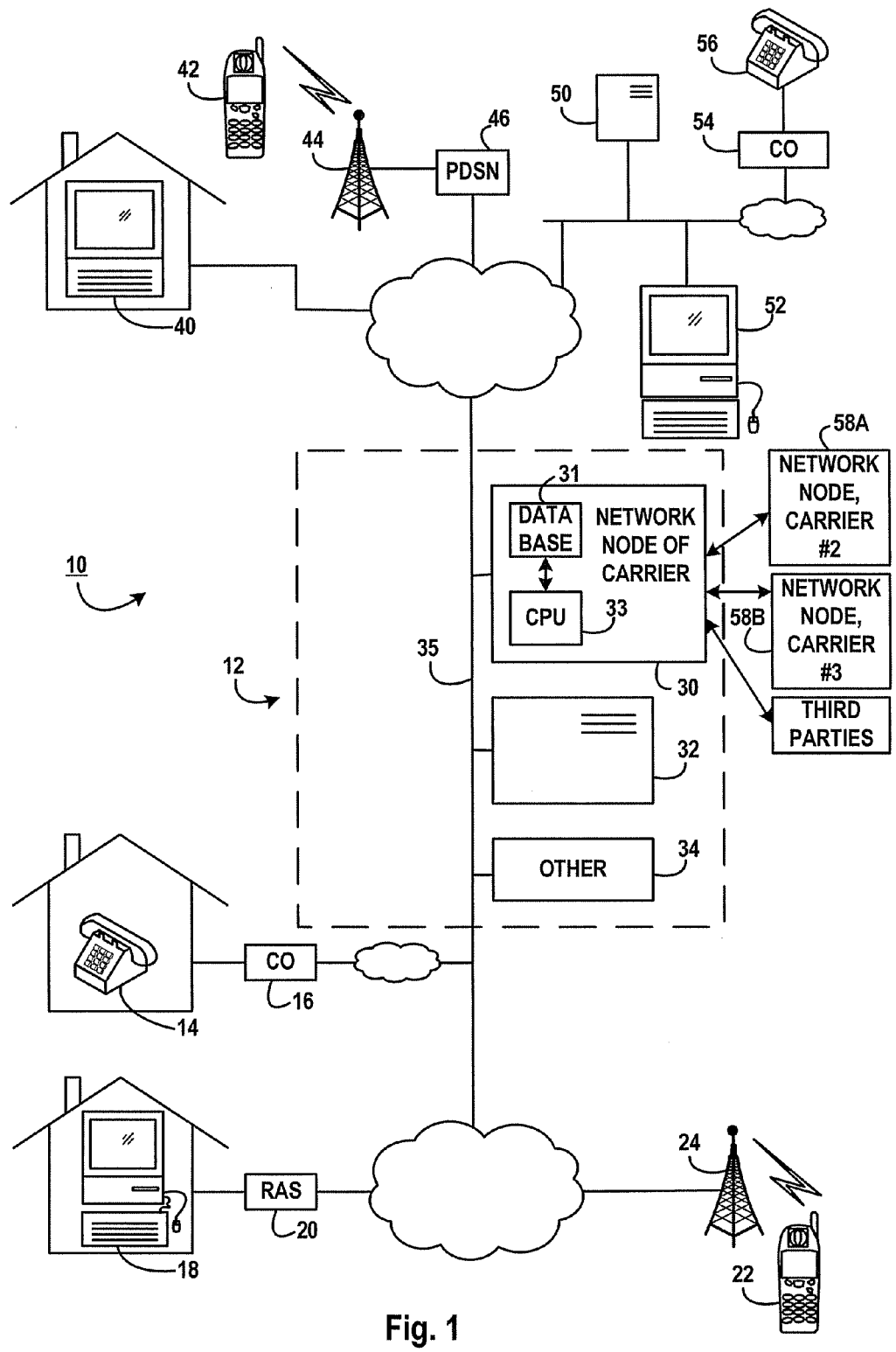
FIG. 1 is a diagram of a communication system environment in which the invention can be practiced.

FIG. 1 is a diagram of a communication system 10 in which call processing of incoming messages is controlled or managed based on trust scores. The system 10 includes a telecommunications service provider 12 that serves a plurality of different types of subscribers, including a first subscriber having a telephone 14. The telephone 14 places calls on the public switched telephone network via a telephone company central office 16. A second subscriber could be a user with a personal computer 18 that is connected to the interne via a remote access server 20, which may or may not be operated or managed by the telecommunications service provider. A third type of subscriber could be a user of a cellular telephone 22 which receives and sends calls via a cellular telephone infrastructure shown simply as cellular base station antenna 24.

The telecommunications service provider or carrier 12 includes an infrastructure, which is shown greatly simplified in the FIG. 1. The infrastructure includes a network node or server 30 that computes or obtains trust scores for parties calling the subscribers 14, 18, 22. The network node 30 includes a central processing unit 33 and a database 31 of threshold trust score information and associated call-processing instructions for the subscribers 14, 18, 22. The network node 30 could take the form of a general-purpose computer, specially programmed computer, Windows NT server, or other type of platform. The network node 30 could also be provided to perform other processing functions. The infrastructure 12 of the carrier further includes other servers, e.g., a billing or accounting server 32, and other communications equipment 34, the details of which are not important.

Messages are sent from a variety of possible parties to the subscribers of the telecommunications service provider. The sources of these messages could include a personal computer 40, a cellular telephone 42 (via cellular tower 44, packet data serving node 46 and other cellular telephony infrastructure), a server 50 on a network, and other possible sources include personal computer 52 and plain old telephone 56 via telephone company central office 54. The sources shown at the top of FIG. 1 are of course merely representative of a large population of potential parties that may call, email, or otherwise communicate with the subscriber equipment 14, 18 and 22. Additionally, some or all of the sources 40, 42, 50, 52, 56 may also be subscribers to the telecommunications services provided by the service provider 12.

The problem arises in that one or more of the sources 40, 42, 50, 52, 56 may send unwanted messages to the subscribers 14, 18 and 22. Hence, the present invention contemplates establishing a trust score. The trust score can be associated with a communications pair (sending party and recipient party) and thus context specific, or it could be assigned to the source of the message (or the message itself) based on just the communications patterns of the source. The trust score for the incoming message is a score, value or index, typically but not necessarily a numerical value. The value of the trust score bears a correlation to probability that the message is one that the called party or subscriber would wish to receive, i.e., is a legitimate message, as opposed to a junk email (spam), a phone call from a telemarketer, or other types of unwanted messages.

The subscribers 14, 18, 22, specify with the carrier 12 threshold trust scores and associated call processing instructions that dictate how incoming messages are to be processed depending on the trust score assigned to the message. For example, the trust score for an incoming message could be a numerical index value (e.g., 19 on a scale of 1 to 100). The processing of the message will depend on the relationship between the trust score associated with the message and the threshold. For example, the subscriber could specify that if the trust score associated with the message is below 25, the message is blocked, if it is between 25 and 50 and the message is a phone call, the call goes to voice mail, and if the score is above 50 the call is passed through to the subscriber. The subscriber's threshold values and associated call processing instructions are preferably stored in the network node 30, e.g., in the database 31.

The trust scores for the sources 40, 42, 50, 52, 56 could be stored in the database 31, calculated in real time at the time the message is sent to or accessed by the subscriber, or stored in another computer and accessed by the network node 30. For sources 40, 42, 50, 52, 56 that are also subscribers to the services provided by the telecommunications service provider 12, the service provider will have a database of messaging patterns of the sources and use those messaging patterns to calculate a trust score. Examples of calculation of trust score based on messaging patterns are explained below. Call pattern data could be shared among multiple communications service providers to enable trust scores to be established for a large population of callers/sources of messages. Such pattern data could be shared in raw form, or the pattern data could be hashed in order to preserve privacy yet still useable to determine trust scores.

If the source of the message is not a subscriber to the service provided by the carrier 12, there are a number of possible scenarios of how the call processing could proceed. If the source is not a subscriber, but the source is a subscriber to another telecommunications service provider that calculates trust scores for its subscribers, the service provider 12 could obtain the trust score from the other telecommunications service provider. The other telecommunications service providers would include network node 58A and 58B that the node 30 would query to obtain current trust score for non-subscriber sources. If the source of the message is not a subscriber to the service provided by the carrier 12, and the carrier 12 cannot determine the identity of the source's service provider, then the carrier 12 could simply allow the call to go through and not perform any filtering at all since it may not be able to determine a trust score for the source.

The subscribers 14, 18 and 22 could provide threshold trust scores or weighting values to use to calculate a trust score for a source of a message in any convenient fashion, such as by accessing an interactive web-based application that explains the trust score process and allows the users to enter threshold trust scores and processing instructions. Other methods are possible.

Figure 2:
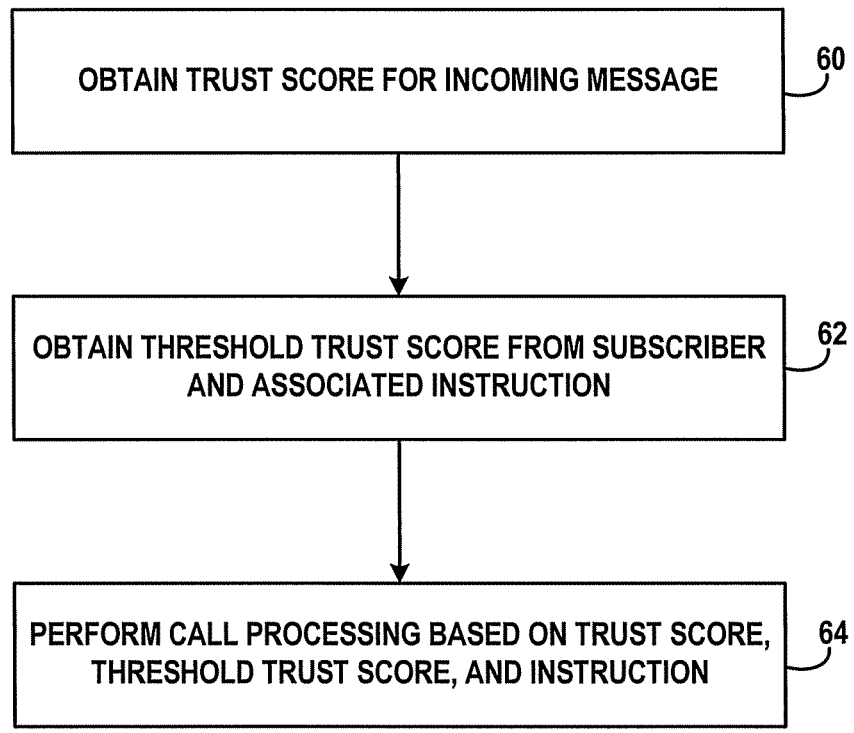
FIG. 2 is a flow chart showing a sequence of events for call processing based on trust scores in a preferred embodiment.

FIG. 2 is a flow chart showing a sequence of events for call processing based on trust scores in a preferred embodiment. At step 60, an incoming message for a subscriber to the service of the carrier 12 is received and the carrier 12 obtains a trust score for the incoming message. This could be done by accessing the database 31 of trust scores in the network node 30, accessing the trust score by query of a node in another carrier's network, or by calculation based on the record of messaging patterns for the source of the message.

At step 62, the node 30 obtains or accesses the threshold trust scores data from the subscriber (called party or destination for the message), and the associated call processing instructions.

At step 64, the node 30 performs the call processing based on the trust score of the message or source of the message, the threshold trust score and the associated call processing instruction. For example, the user may have defined a "low" trust score level and the instruction that "low" trust score messages should be blocked. If the incoming message has a score that falls into the low category, the call is blocked. As another example, suppose the message is an email and the source of the message has a trust score of 1 on a scale of 1 to 5. The user could specify a threshold of 2 and a processing action such that if an incoming email has a trust score of 1 or 2 the email is sent automatically to a deleted items folder, otherwise the email is allowed to enter the in-box. These of course are just simple examples of how the concept of trust scores could be used to determine message processing instructions. The implementation of these concepts may vary depending on how the trust scores are calculated, the number of levels that are in the scoring system, the options available to subscribers to set thresholds, and the number of different processing instructions and options that are provided to the subscribers depending on how the trust score for a particular message relates to the system of thresholds or levels defined by the subscriber.

Figure 3:
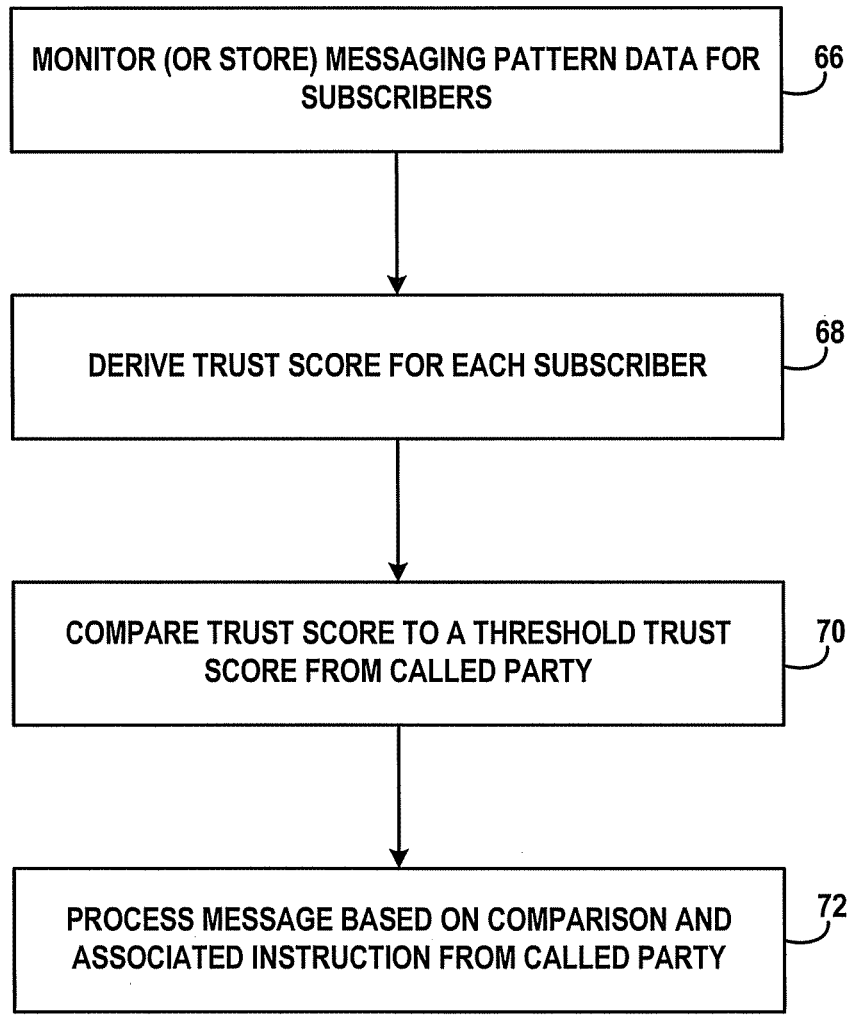
FIG. 3 is a flow chart showing a sequence of events for call processing based on trust scores in another possible embodiment.

FIG. 3 is a flow chart showing a sequence of events for call processing based on trust scores in another possible embodiment. At step 66, a network node (which may be node 30 or some other node, such as computer 32 in FIG. 1), monitors and preferably stores messaging patterns of data for subscribers to the telecommunications service provider or carrier 12. The messaging patterns could include one or more of the following items:

Number of phone calls made
Number of phone calls received
Average length of time of phone call made
Average length of time of phone call received
Ratio of number of calls made to number of different callees
Number of SMS messages sent
Number of SMS messages received
Number of emails sent
Number of emails received
Ratio of number of emails sent to emails received
Length of message
Average length of reply
Contents of address books in an email application
Speed of reply (delay between time of receipt of message and time of response to message)

In the above list, replies can be sent either in the same medium as the original message or in a different medium. For example, a person may receive an SMS text message and respond with voice. The idea here is that messaging patterns based on data such as listed above can be used to determine the trustworthiness or "reputation" of a source. The use of such data to determine trust scores makes use of inferences or assumptions as to "relatedness" between parties. For example, if the speed of reply between two parties is rapid, it can be inferred that the two parties are related in some sense and that a new incoming message from one party to the other should have a high trust score. As another example, a party that sends lots of messages in only one format, but there are few replies from all subscribers to the messages and only a small percentage of those are prompt, would indicate that there is little "relatedness" of the party to the other subscribers and a new message from the party to a subscriber should have a lower trust score. Telemarketers (i.e., a low reputation) make a large number of short calls to many different numbers. They receive few inbound calls. On the other hand, close friends make a small number of long calls to the same few telephone numbers, with calls being relatively evenly initiated by each party. Mean call length, mean number of parties called, and the ratio of inbound to outbound calls can be combined to form a trust score for a called party. Similarly, replies to messages can be used to determine reputation or trust scores. If A sends B an email, SMS or voice mail message, and B replies, then that indicates some form of relationship between A and B. The longer the reply (i.e., it is not just "sorry, I think you have called the wrong number" or "sorry, I do not talk to phone solicitors") the greater the bond between A and B. A party or source with lots of strong bonds (lots of long replies) may be deemed to have a greater social "reputation" or "social connectedness" and thus be assigned a higher trust score. It is also possible to share data pertaining to trust scores among communication service providers so as to enable trust scores to be computed across multiple providers.

At step 68 in FIG. 3, a trust score is derived for each of the subscribers based on their calling pattern data monitored and stored in step 66. Algorithms for calculating a trust score can be developed by persons skilled in the art from the present disclosure. Examples are given later in this document. The derivation of a trust score for the subscribers can thus be performed and stored in a database and used for all subsequent communications from the subscribers to other subscribers. The trust scores could be derived periodically, e.g., once per year. Alternatively, the trust score for a subscriber could be calculated once, after a sufficient period of time has elapsed to collect a sufficient amount of messaging pattern data. Alternatively, the trust scores could be calculated in such a fashion that the age of the data is weighted such that older data is given less weight. For example, messaging patterns or relatedness data (such as address book contacts) that is more recent is given more weight than messaging patterns and data that is more than six months old.

At step 70, a message is sent to one of the subscribers from one of the other subscribers, a trust score is obtained for the source of the message, and a comparison is made between the trust score for the source of the message and the threshold trust score set by the called party subscriber. This step could be done by the network node 30 of FIG. 1 accessing the database 31 and comparing the trust score for the source with the thresholds set by the called party subscriber. For example, an incoming phone call could have a trust score of 5 on a scale of 1 to 5, and the node compares 5 with the threshold set by the user, for example if trust score for a phone call is greater than 3, pass the call through.

At step 72, the network node 30 processes the message based on the comparison and associated instruction from the called party. In the previous example, since the threshold is 3, and the trust score for the call is 5, the instructions are to pass the call through and so the network node passes the call through to the called party subscriber. A variety of call processing actions could take place in step 72, such as block the call, send the call to voice mail, send an automatic reply to the caller telling them the call has been blocked, blocking an email message, sending an email automatically to a deleted items folder, passing the email through, sending an auto reply to the email, blocking a SMS or instant messaging message, sending the SMS or instant message through, etc. The action could span multiple communications format or media, for example an email with a high trust score could be sent to a portable handheld device. A text message with a high trust score could be converted into a voice message and sent to the user's cellular telephone. The action to take is preferably specified in advance by the subscriber. For example, the subscriber could establish their preferences for processing messages based on the trust scores and thresholds in an interactive web-based application accessed at a web site of the telecommunications service provider 12.

Figure 4:
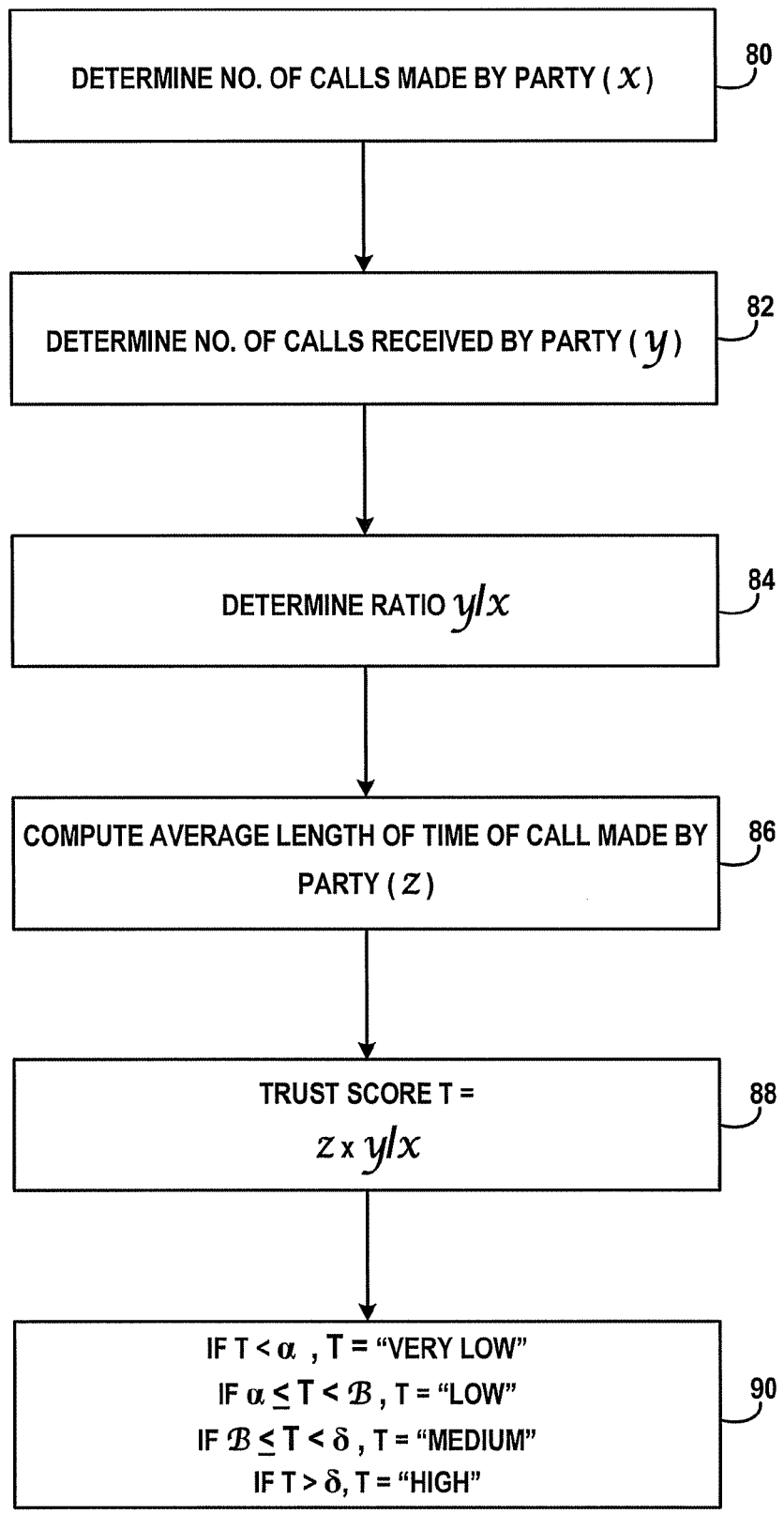
FIG. 4 is a flow chart showing one possible method for establishing trust scores for a party based on calling patterns of the party.

FIG. 4 is an example of one possible way to calculate a trust score for a party X based on messaging patterns for a party. The party in this example is a subscriber to the services of the carrier 12. The type of messages could include telephone, SMS, instant messaging, email, or combination thereof. At step 80, a determination is made of the number of "calls" made by the party, value X. Here, the term "calls" could be any type of message, or just telephone calls. This could be determined by accessing the phone, email, SMS, etc. records of the party, which would be stored in a network server or computer in the carrier 12.

At step 82, a determination is made of the number of "calls" received by the party, value Y. Again, the "calls" could be email messages received, phone calls received, SMS messages received, and/or instant messages received.

At step 84, a ratio Y/X calculated.

At step 86, a computation is made of the average length of time of calls made by the party, value Z.

At step 88, a trust score T is calculated as the product of Z and the ratio Y/X. The theory here is that a party that makes a very high number of calls and receives few calls, the ratio Y/X will trend toward a low number. Furthermore, if the average length of calls is short, Z will also be a low number. Therefore T will be a low number. These calling patterns are characteristics of a telemarketing calling pattern. On the other hand, if a relatively low number of calls are made and the duration is relatively long, the product of Z and Y/X will trend towards a higher number. This is a calling pattern that is more likely associated with a person who is not a telemarketer.

The trust score T can be scaled to fall into a range as shown in step 90. If T is less than some number $\alpha$, then trust score T is deemed "very low". If T is between $\alpha$ and $\beta$, then T could be deemed to be 'low". If T is between $\beta$ and $\delta$, then the trust score could be "medium". If T is greater than or equal to $\delta$, then T could be assigned a "high" score. The values of $\alpha$, $\beta$ and $\delta$ could be established by the carrier, or could be set by the subscriber (called party) to customize how they wish to set the trust score thresholds.

This example is a simple example of how a trust score can be calculated. Many more examples, including more sophisticated examples involving other messaging pattern data, relatedness data, etc., could be developed by persons skilled in this art, and the scope of the present invention is intended to cover such other examples.

Figure 5:
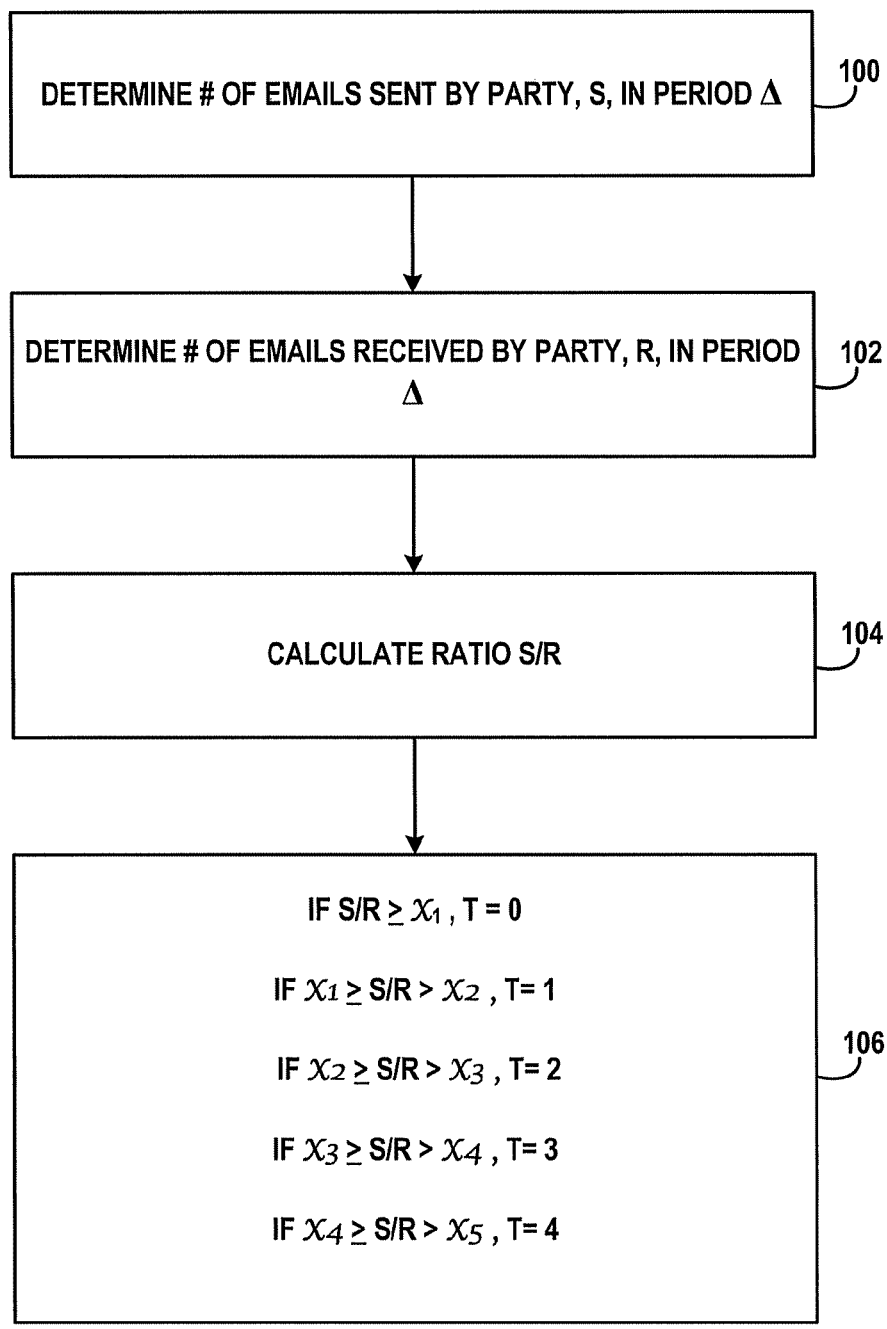
FIG. 5 is a flow chart showing one possible method for establishing trust scores for a party based on email patterns of the party.

FIG. 5 is a flow chart showing one possible method for establishing trust scores for a party based on email patterns of the party. At step 100, a determination is made of the number, S, of email messages sent by the party S in a time interval $\Delta$. The value of $\Delta$ could be set at one month, one week, one year, or some other time interval. At step 102, a determination is made of the number, R, of emails received by the party, in the time interval. At step 104, a ratio S/R is calculated. The trust score could be equal to the ratio S/R or could be scaled as shown in step 106 on a scale of 0 to 4. In step 106, if S/R is greater than some value X1, then T is equal to 0. Similarly, values for T=1, 2, 3 and 4 could be determined as indicated in FIG. 5, step 106.

FIG. 6 is an example of one possible database or table 110 that lists threshold trust scores for a plurality of subscribers and the call processing instructions associated with each of the threshold trust scores. On the left hand side of the table, the subscriber name 112 or other identifying information is listed, e.g., for subscriber Tom. The table includes instructions for different types of incoming messages, including email 114, phone calls 116 and short message service (SMS) messages 118. The top of the table includes a field 120 which includes threshold trust scores and the field 120 is populated with instructions for each type of message and the associated trust score. The example of FIG. 6 is based on a trust score system with values between 1 and 10. For subscriber Tom, the instructions are to block incoming email messages with a trust score of 3 or less, send email to the deleted items folder if the trust score is 4 or 5, and send email to the in-box if the trust score is 6, 7, 8, 9 and 10. The table is populated for other subscribers 122, 124, 126 etc. as indicated in the table.

FIG. 7 is another example of one possible database or table that lists threshold trust scores for a plurality of subscribers and the call processing instructions associated with each of the threshold trust scores. The database 130 lists the subscribers, and the types of incoming messages as indicated in fields 132, 138 and 138, and a field 134 with headings for trust scores that are general index values "very low", "low", "medium" and "high." The field 134 includes the subscriber's processing instructions for how to process incoming messages based on the trust score of the incoming message and the trust score thresholds shown at the top of field 134.

The trust score for the source of the message could take the form of a numerical value, or general descriptor or index such as "low" or "high", that is constant for all subscribers. For example, a certain party X that sends an extremely high volume of email messages but receives very few emails is likely a spammer and would therefore have a trust score with a low numerical value, e.g., 1 on a scale of 1 to 10, or a trust score of "low". Alternatively, the trust score for the party X could vary for each of the subscribers. In particular, the rules or formulae, which are used to calculate the trust score, could be individually specified or weighted in accordance with criteria specified by each subscriber. For instance, party X might have a certain telephone calling pattern, for example, a very high number of short telephone calls, and very few long telephone calls and very few telephone calls coming in, i.e., a calling pattern that could be associated with a telemarketer. Subscriber A might view that calling as reflecting a high level of trust, while subscriber B might view the pattern as reflecting a low level of trust. The carrier could allow subscribers A and B to specify different rules or formulae as to how the messaging pattern of X should be weighted or analyzed in order to compute the trust score for messages originating from X. As such, the network node 30 may maintain a matrix of trust scores for a population of calling parties that send messages to a population of subscribers.

The invention can be considered a method for processing incoming messages, as describe above. Alternatively, the invention can be embodied as a network node, server, or other entity of a telecommunication service provider ("carrier" herein) or other such intermediary carrying out several functions. Firstly, the node of the carrier, as an intermediary in telecommunications for subscribers, regularly monitors messaging patterns for subscribers (and possibly non-subscribers, in cooperation with other carriers) and computes a "trust score" per subscriber. The messaging patterns could be patterns of communications generally, which could include phone call patterns, electronic messaging patterns (e.g., e-mail, instant messaging messages, short messaging service (SMS) messages as defined in the standards document IS-41C, etc.), fax messaging patterns, or other messaging patterns. The patterns could also relate specifically to interaction between the subscriber and particular other subscribers of interest (e.g., those other subscribers who will set rules as described below). The trust scores could be either computed in real time, at the time of the sending of the message in question, or could be computed at some frequency (e.g., monthly, weekly or semi-annually) and stored in a central database.

The network node also receives and stores input from subscribers that is used to indicate how the call processing is to proceed for a message with a given trust score. This input will take for the form of a threshold trust score and associated call-processing action to take, such as for example call blocking or call forwarding. The threshold trust score and the action to take are stored in a database as shown in FIGS. 6 and 7. The threshold trust score could be a numerical value and instructions associated with the numerical value. The subscriber could specify multiple trust scores and instructions for each trust score. For example, the subscriber could specify that if the trust score for an incoming message is below 3 (on a scale of 1 to 10) then block the message, if the trust score is 4 or 5 and the message is a phone call, send it to voice mail, and if the message is an email, put it in a deleted items folder, and if the trust score is above 5, send the message through. In a system in which trust scores are computed and stored as general indices, such as "very low", "low", "medium" and "high", the threshold trust score could also take the form of an index such as "low", and the subscriber provides instruction for how call processing should proceed for one or more of the general indices, e.g., if the incoming message has a "low" trust score, block the message.

The node detects a message (phone call, email, SMS message, etc.) placed to the given subscriber from a source. The source may or may not be a subscriber to the same telecommunications service provider. The carrier determines the trust score associated with the source, or equivalently the trust score assigned to the message itself (e.g., by immediate computation from messaging patterns of the party and the rules specified by the subscriber or the carrier, or by reference to a database). The carrier compares the trust score to the threshold that was designated by the called party subscriber. The carrier then responsively carries out the call processing action that was designated by the subscriber based on the comparison of the trust score for the message with the threshold trust score. For example, if the trust score for the message is 5 on a scale of 1 to 10 and the message is an email, and the user specified that trust scores of 5 or more are "valid" email messages, the email message is sent to the subscriber's in-box. If the trust score for the message is "4" and the message is an email, and the user specified that emails with a trust score below 5 are to be sent to the deleted items folder in their email application, then such action is taken. Analogous functions are performed for other types of messages, such as phone calls or SMS message. If the subscriber specified that "low" phone, instant messaging or SMS messages are to be blocked, the message is blocked. The carrier may provide a message to the calling party telling them that the message was blocked, depending on user preferences.

Variations from the disclosed embodiments are possible without variation from the scope of the invention. The scope of the invention is to be determined from the appended claims.

The invention claimed is:

1. A method for processing an incoming message for delivery to a recipient, the message originating from a source, comprising the steps of:
    a) determining a trust score for said incoming message based on a messaging pattern of messages from the source, the messaging pattern comprising data relating to the following: (1) a number of messages sent by the source, (2) a number of messages received by the source, (3) where the message is a phone call an average length of phone calls made by the source, (4) where the message is a phone call an average length of phone calls received by the source, (5) where the message is an electronic message a ratio of electronic messages sent by the source to electronic messages received by the source;
    b) obtaining at least one threshold trust score based on a type of the incoming message, said threshold trust score being associated with a message processing instruction; and
    c) performing processing of said incoming message in accordance with said trust score, said threshold trust score and said associated message processing instruction.

2. The method of claim 1, wherein step a) comprises the steps of identifying the source of said incoming message and obtaining a trust score for said source, and using the trust score of the source as the trust score for the incoming message.

3. The method of claim 1, wherein said trust score is calculated in advance of a time of receipt of said incoming message and thus independent of content of the incoming message.

4. The method of claim 1, wherein said trust score is stored in a central database.

5. The method of claim 1, wherein said incoming message comprises an electronic message and wherein said trust score is obtained from a messaging pattern of the source of the incoming electronic message.

6. The method of claim 5, wherein said incoming electronic message comprises an email message.

7. The method of claim 1, wherein said incoming message comprises a phone call.

8. The method of claim 1 wherein messaging patterns are tracked for a plurality of subscribers to a common telecommunications service, said plurality of subscribers including said recipient, wherein trust scores are determined based on messaging patterns of said subscribers, wherein the source of said incoming message comprises a subscriber in said plurality of subscribers, and wherein step a) is performed by calculation of the trust scores prior to a time of transmission of said incoming message.

9. The method of claim 1, wherein the data further includes (6) contents of an electronic address book for a plurality of subscribers.

10. The method of claim 1, wherein the data includes, for an electronic message, a mean length of response messages to previous messages from the source.

11. The method of claim 1, wherein said trust score comprises a numerical index and wherein said threshold trust score comprises a numerical index.

12. A method for filtering a message from a first party to a second party, comprising the steps of:

a) obtaining messaging patterns for a plurality of parties, said plurality of parties including said first party, and the messaging patterns comprising data relating to (1) a number of messages sent, (2) a number of messages received, (3) where the message is a phone call an average length of phone calls made, (4) where the message is a phone call an average length of phone calls received, (5) where the message is an electronic message a ratio of electronic messages sent to electronic messages received;

b) deriving, from said messaging patterns, a trust score for each of said parties in said plurality of parties, wherein the trust score is derived independently and in advance of the receipt of the message from the first party to the second party;

c) comparing the trust score for said first party to a threshold trust score specified by the second party, the threshold trust score being based on a type of the message; and d) filtering the message in accordance with instructions from said second party and the results of the comparison at step c).

13. The method of claim 12, wherein said first and second parties are subscribers to a common telecommunications service provider service.

14. The method of claim 12, wherein said messaging patterns comprise patterns of the number of electronic messages sent and received by said plurality of parties.

15. The method of claim 12, wherein said messaging patterns comprise patterns of phone calls and include at least one of: phone call length per call, number of phone calls made, number of phone calls received, and ratio of phone calls made to phone calls received.

16. The method of claim 12, wherein said trust score comprises a numerical index and wherein said threshold trust score comprises a numerical index.

17. The method of claim 12, wherein said step of filtering comprises the step of blocking said communication if said trust score is below the threshold trust score.

18. A network apparatus for use in processing a message directed to a subscriber in accordance with instructions from said subscriber, wherein a source of said message is assigned a trust score; said network apparatus comprising:

a database of trust scores for a plurality of subscribers based upon messaging patterns of the subscribers, the messaging patterns including statistical data pertaining to messages sent and received by the subscribers, and the messaging patterns comprising data relating to (1) a number of messages sent, (2) a number of messages received, (3) where the message is a phone call an average length of phone calls made, (4) where the message is a phone call an average length of phone calls received, (5) where the message is an electronic message a ratio of electronic messages sent to electronic messages received;

a machine readable storage medium storing a threshold trust score from said subscriber, said threshold trust score being associated with a processing instruction and based on a type of message; and a processing system comparing said trust score assigned to said source with said threshold trust score and responsively processing said message in accordance with said comparison and the processing instruction associated with said threshold trust score.

19. The network apparatus of claim 18, wherein said processing system compares trust scores assigned to messages directed to said plurality of subscribers with threshold trust scores from said plurality of subscribers and responsively processing said messages in accordance with said comparison and processing instructions associated with said threshold trust scores.

20. The network apparatus of claim 18, wherein said threshold trust score comprising a numerical index.

21. The network apparatus of claim 18, wherein said message comprises an electronic message.

22. The network apparatus of claim 18, wherein said message comprises a phone call.

* * * * *